(12) United States Patent
McClary (10) Patent No.: US 7,075,951 B1
(45) Date of Patent: Jul. 11, 2006

(54) METHOD AND APPARATUS FOR THE OPERATION OF A STORAGE UNIT IN A NETWORK ELEMENT

(75) Inventor: Michael McClary, Newark, CA (US)

(73) Assignee: Redback Networks Inc., San Jose, CA (US)

(*) Notice: Subject to any disclaimer, the term of this patent is extended or adjusted under 35 U.S.C. 154(b) by 995 days.

(21) Appl. No.: 10/102,461

(22) Filed: Mar. 20, 2002

Related U.S. Application Data (60) Provisional application No. 60/334,486, filed on Nov. 29, 2001.

(51) Int. Cl.
*H04J 3/22* (2006.01)

(52) U.S. Cl. .................... 370/528; 375/363

(58) Field of Classification Search ........... 370/503, 370/504, 505, 506, 528, 535, 538, 543; 375/354, 375/356, 363, 368, 371, 372, 376; 714/48, 714/52
See application file for complete search history.

(56) References Cited

U.S. PATENT DOCUMENTS

| | | | |
|---|---|---|---|
| 3,777,268 A * | 12/1973 | Cleobury et al. ........... 375/317 |
| 4,667,324 A | 5/1987 | Graves | |
| 4,736,363 A | 4/1988 | Aubin et al. | |
| 5,159,595 A | 10/1992 | Flanagan et al. | |
| 5,268,936 A | 12/1993 | Bernardy | |
| 5,400,369 A | 3/1995 | Ikemura | |
| 5,511,077 A | 4/1996 | Shimada | |
| 5,519,700 A | 5/1996 | Punj | |
| 5,533,018 A | 7/1996 | DeJager et al. | |
| 5,550,820 A | 8/1996 | Baran | |
| 5,606,370 A * | 2/1997 | Moon ................ 375/240.23 |
| 5,608,733 A | 3/1997 | Vallee et al. | |
| 5,621,773 A | 4/1997 | Varma et al. | |
| 5,805,571 A | 9/1998 | Zwan et al. | |
| 5,825,770 A | 10/1998 | Coady et al. | |
| 5,963,564 A | 10/1999 | Petersen et al. | |
| 6,038,226 A | 3/2000 | Ellersick et al. | |
| 6,075,788 A | 6/2000 | Vogel | |
| 6,185,635 B1 | 2/2001 | O'Loughlin et al. | |
| 6,198,751 B1 | 3/2001 | Dorsey et al. | |
| 6,205,142 B1 | 3/2001 | Vallee | |

(Continued)

OTHER PUBLICATIONS

JHA, P.K., "Bandwidth Maximization for SONET/SDH and Direct Data over Optical Networks," http://www.isoc.org/inet2000/cdproceedings/lg/lg_3.htm, 26 pages, Nov. 16, 2000.

(Continued)

*Primary Examiner*—Wellington Chin
*Assistant Examiner*—John Shew
(74) *Attorney, Agent, or Firm*—Blakely Sokoloff Taylor & Zafman LLP (57) ABSTRACT

In an embodiment, an apparatus includes a storage unit to store data from a data signal. The apparatus also includes control circuitry coupled to the storage unit. The control circuitry is to cause the storage of the data from the data signal into the storage unit at a nominal rate upon determining that the data signal includes a number of errors.

32 Claims, 5 Drawing Sheets

FLOW DIAGRAM 500

U.S. PATENT DOCUMENTS

| | | |
|---|---|---|
| 6,237,029 B1 | 5/2001 | Master et al. |
| 6,272,144 B1 | 8/2001 | Berenbaum et al. |
| 6,285,673 B1 | 9/2001 | Blackburn et al. |
| 6,320,877 B1 | 11/2001 | Humphrey et al. |
| 6,385,209 B1 * | 5/2002 | Skirmont et al. ........... 370/419 |
| 6,463,111 B1 * | 10/2002 | Upp ........................... 375/372 |
| 6,988,238 B1 * | 1/2006 | Kovacevic et al. ......... 714/799 |
| 2001/0033580 A1 | 10/2001 | Dorsey et al. |
| 2002/0018468 A1 | 2/2002 | Nishihara |
| 2003/0133475 A1 * | 7/2003 | Solheim et al. ............. 370/532 |

OTHER PUBLICATIONS

Kusyk, R.G., et al., "Analysis of Techniques for the Reduction of Jitter Caused by SONET Pointer Adjustments," IEEE Transactions on Communications, vol. 42, No. 2/3/4, pp. 2036-2050, Feb./Mar./Apr., 1994.

* cited by examiner

METHOD AND APPARATUS FOR THE OPERATION OF A STORAGE UNIT IN A NETWORK ELEMENT

RELATED APPLICATIONS

This application claims the benefit of U.S. provisional patent application No. 60/334,486 entitled "Method and Apparatus for the Operation of a Storage Unit in a Network Element" filed on Nov. 29, 2001.

FIELD OF THE INVENTION

The invention relates to the field of communications. More specifically, the invention relates to the operation of a storage unit in a network element.

BACKGROUND OF THE INVENTION

In the field of communications, the need for high-speed transmission of data including video and audio has continued to increase. Moreover, in addition to the demand for higher bandwidth, there has also been an increased need for various types of services that employ different protocols. For example, certain customers (e.g., companies providing voice services) of high-speed networks want to operate on a Time Division Multiplexing ("TDM") Network, which combines different data streams, such as voice traffic, such that each data stream is assigned a time slot within the combined data stream. Moreover, other customers of high-speed networks may desire to transport data employing packet-based data streams, which do not have dedicated timeslots to given packets. Examples of the types of packets that can be placed into such data streams include Asynchronous Transfer Mode ("ATM"), Internet Protocol ("IP"), Frame Relay, Voice Over IP, and Point-to-Point Protocol ("PPP"). Typically, TDM based Synchronous Optical Network ("SONET") and Synchronous Digital Hierarchy ("SDH") technologies can transport this packet data traffic in today's market.

Network elements are used to route or switch data of these different protocols across such high-speed networks. Moreover, these network elements typically include a number of line cards that include a number of ports to receive and transmit this data of different standards and protocols. These line cards typically contain a number of circuits and memory for storing and provisioning of the transferred data. In addition, these network elements typically include a number of control cards that include a number of ports to receive and transmit data to the line cards. Data of different transfer rates, i.e., within different clock domains, may be transmitted through and among the various network elements.

Sometimes, data of one traffic rate, e.g., DS1, is bundled for transmission within a signal of a higher traffic rate, e.g., DS3, requiring several interim conversion processes. Historically first-in-first-out data registers ("FIFOs") have been used to store and transmit data within portions of network elements. When storing and transferring data within one clock domain, a synchronous FIFO is used. When storing and transferring data between two clock domains, an asynchronous FIFO is used. An asynchronous FIFO stores the data and transmits the data in a different clock domain. Accordingly, when data traffic of one rate, e.g., DS3, is converted into a different rate, e.g., SONET, an asynchronous FIFO is employed for the loading and unloading of data. Control circuitry containing flip-flops, pointers, double-sync logic, gray code conversion tables, etc. are used to provision the data through the FIFOs.

A phase-locked loop is used to generate a clock by which a FIFO is unloaded, and generally consists of a frequency phase detector, a low-pass filter, and a voltage controlled crystal oscillator ("VCXO"). Specifically, a signal from the FIFO regarding its depth is transmitted to a phase-locked loop. The phase-locked loop generates a clock signal, which is then transmitted back to the FIFO, and is used by the FIFO as the clock by which the FIFO unloads.

In a phase-locked loop, the loop gradually adjusts the VCXO's outputted clock rate (i.e., speeds it up or slows it down) in an attempt to bring the depth of the FIFO to its mid-point without making abrupt changes in the clock signal rate or causing the depth to wander around the correct rate. For example, if the depth of the FIFO is below its mid-point, the VCXO is slowed down (resulting in a slowing of the outputted clock signal) so that the FIFO unloads slower and thus, fills towards its mid-point; if the depth of the FIFO is above its mid-point, the VCXO is sped up (resulting in an increase in the rate of the outputted clock signal) so that the FIFO unloads faster and thus, empties towards its mid-point. The speed of the VCXO is adjusted in relation to the FIFO depth in order to remain at an operating speed that keeps the amount of data in the FIFO roughly equidistant from the extremes of the FIFO (i.e., underflowing (no data in the FIFO when data must be sent) and overflowing (FIFO is full and data is arriving faster than the data is sent)). Ideally, the FIFO is at the midpoint of its depth range, and the VCXO is operating at the midpoint of its speed range, enabling both to adjust to FIFO depth increases or decreases.

Phase-locked loops take time to adjust their operating speed. If they are permitted to follow the depth of the FIFO, inaccuracies of data arrival time would cause unacceptable irregularities in the resulting rate of the clock signal. Therefore, the response of the VCXO to error signals must be slowed. This slowing is performed by the low-pass filter. However, if the FIFO is permitted to remain too far from half-full, or the response of the VCXO to deviations of the amount of data in the FIFO from the desired amount is excessively slowed, a sudden and sustained change in the rate of input to the FIFO could cause the FIFO to overflow or underflow because the speed of the VCXO (and thus the resulting clock signal to unload the FIFO) did not change fast enough.

SUMMARY OF THE INVENTION

A method and apparatus are described for preventing corruption of a data stream that has been recently restored by keeping a phase-locked loop (which is controlling the unloading of a FIFO that is receiving the data stream) operating at a nominal rate during the interruption of the data stream. In an embodiment, an apparatus includes a storage unit to store data from a data signal. The apparatus also includes control circuitry coupled to the storage unit. The control circuitry is to cause the storage of the data from the data signal into the storage unit at a nominal rate upon determining that the data signal includes a number of errors.

In an embodiment, a method includes receiving a data signal. The method also includes determining the data signal includes a number of errors. Additionally, the method includes processing the data signal as if the data signal is independent of the number of errors and is operating at a nominal rate for the data signal. The processing is to include transmitting the data within the data signal into a first-in-first-out (FIFO) memory unit.

BRIEF DESCRIPTION OF THE DRAWINGS

Embodiments of the invention may be best understood by referring to the following description and accompanying drawings that illustrate such embodiments. The numbering scheme for the Figures included herein are such that the leading number for a given element in a Figure is associated with the number of the Figure. For example, system 100 can be located in FIG. 1. However, element numbers are the same for those elements that are the same across different Figures.

In the drawings.

DETAILED DESCRIPTION

A method and apparatus for the operation of a storage unit are described. In the following description, for purposes of explanation, numerous specific details are set forth in order to provide a thorough understanding of the present invention. It will be evident, however, to one skilled in the art that the present invention may be practiced without these specific details.

Overview

Embodiments of the present invention are described in conjunction with the operation of storage units, such as FIFOs, within a network element. This is by way of example and not by way of limitation, as embodiments of the present invention can be incorporated into other operating environments. Moreover, as will be described, embodiments of the present invention enable the depth of a FIFO or other storage unit to remain at a depth associated with storing data from a signal operating at the nominal rate for such a signal, independent of whether the signal includes errors. Accordingly, embodiments of the invention reduce potentially wide fluctuations in the depth of a FIFO. In particular, these potentially wide fluctuations in the depth of a FIFO can be caused when there are sudden changes in the amount of data being inputted into the FIFO due, for example, to periods of inputting data from a signal followed by periods of not inputting data from the signal when the signal contains errors. Further, embodiments of the invention enable a phase-locked loop to remain in lock, with a FIFO (that the loop is controlling) remaining approximately half-full, thereby precluding FIFO and clocking-rate excursions upon signal restoration due to an incorrect clocking rate from the VCXO of the phase-locked loop.

Figure 2:
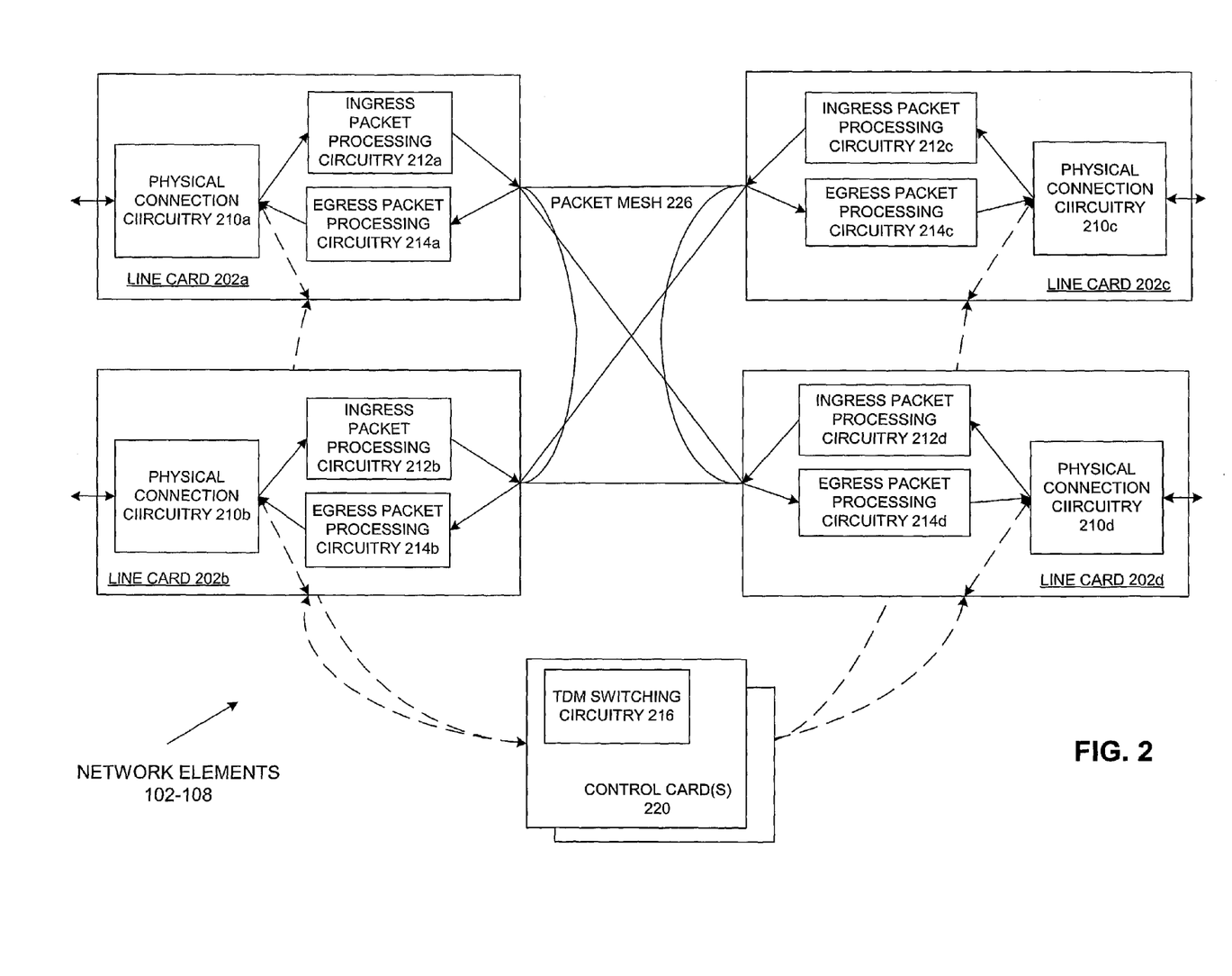
FIG. 2 is a block diagram illustrating portions of in-ring network elements 102–108 (hereinafter, "in-ring network element 102"), according to an embodiment of the invention.
Figure 3:
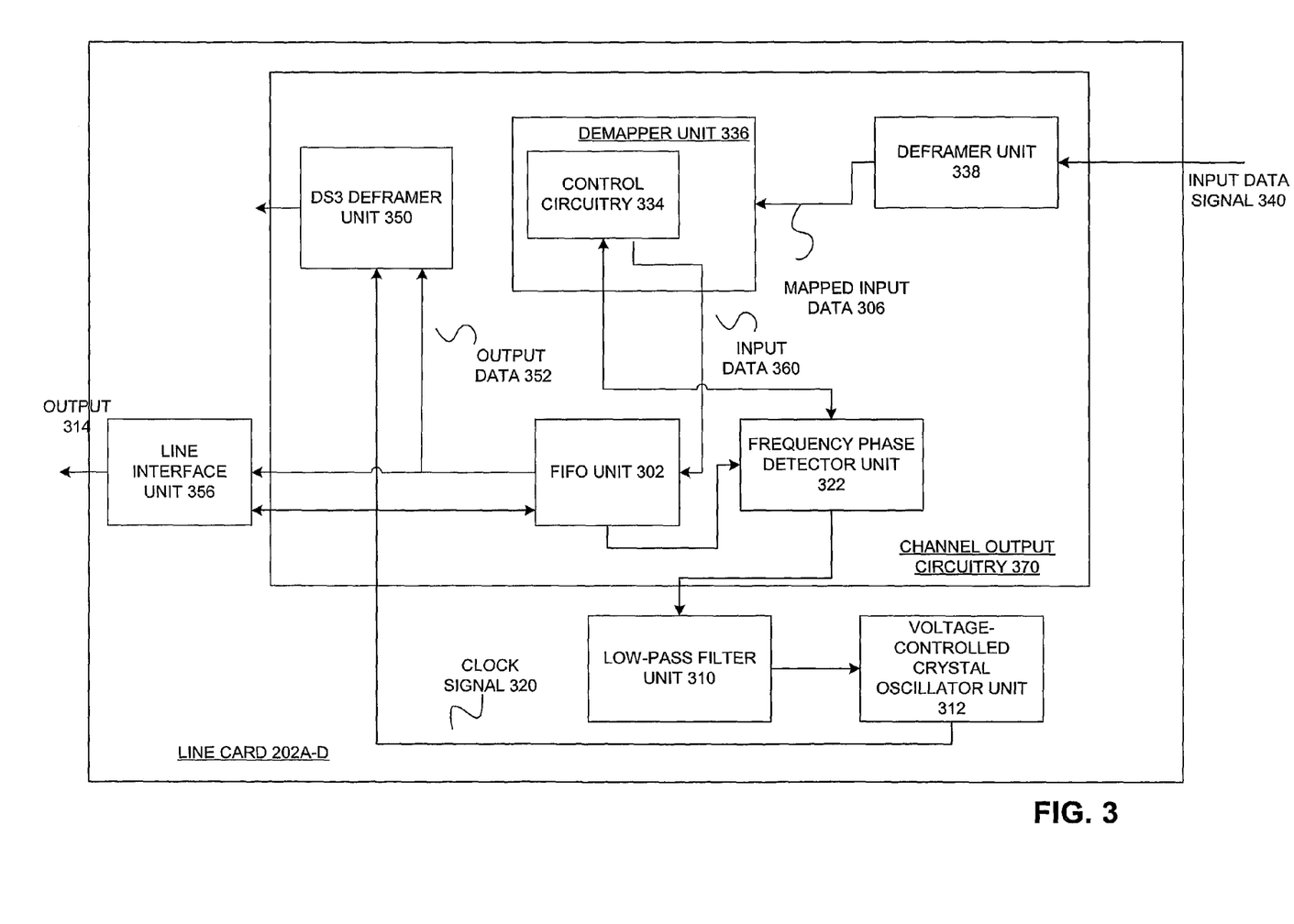
FIG. 3 is a block diagram illustrating portions of physical connection circuitry 210*a*–*d* of line cards 202*a*–*d*, according to an embodiment of the invention.
Figure 5:
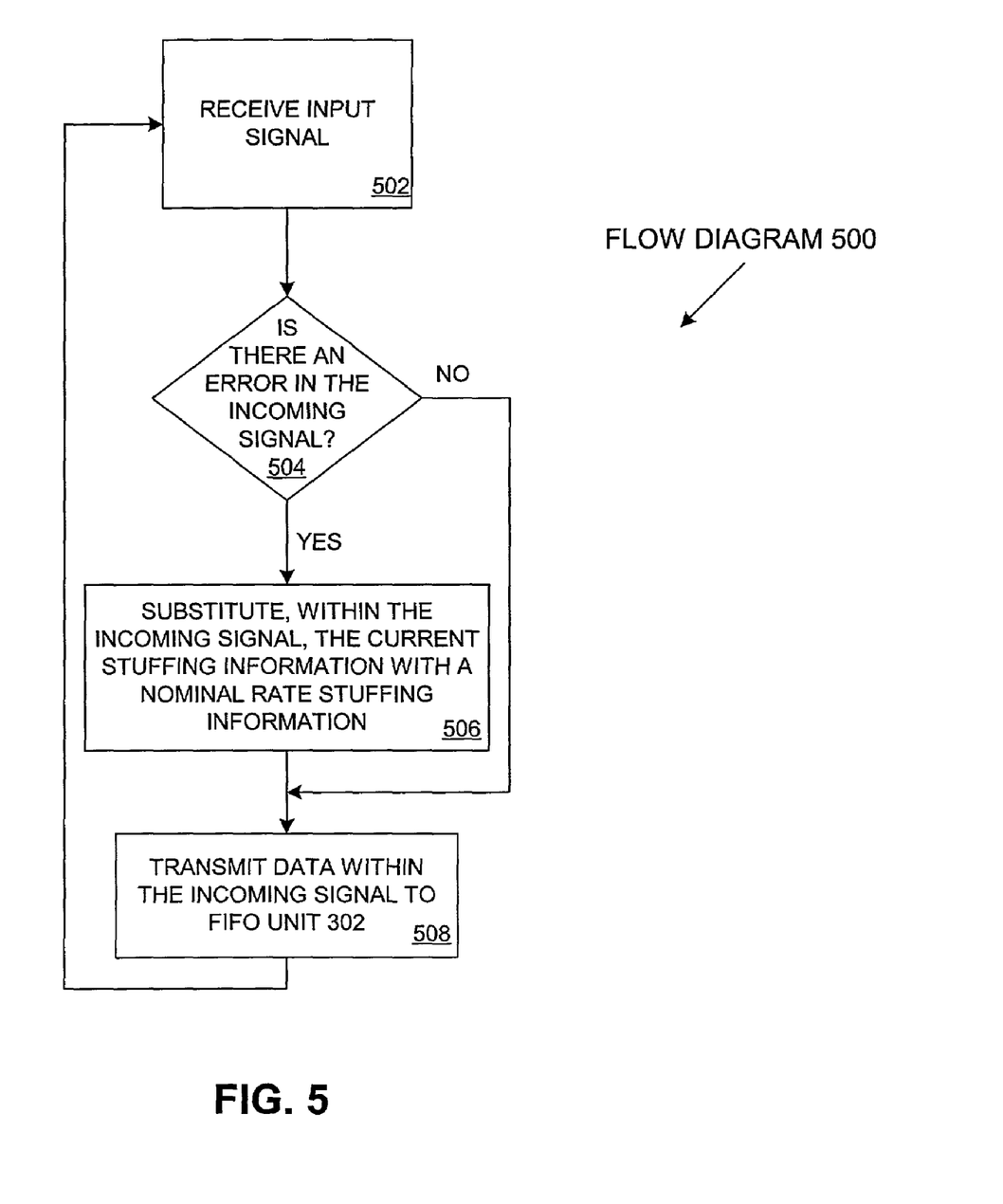
FIG. 5 illustrates a flow diagram for maintaining operations of a FIFO unit at a nominal rate, independent of whether the incoming data signal, whose data is to be stored in the FIFO unit, includes errors, according to an embodiment of the invention.

FIGS. 2 and 3 show block diagrams of exemplary systems for operation of a storage unit, in accordance with embodiments of the invention. FIG. 5 shows a flow diagram illustrating operations for a storage unit, according to embodiments of the invention. The operations of the flow diagram will be described with references to the exemplary systems shown in the block diagrams. However, it should be understood that the operations of the flow diagram could be performed by embodiments of systems other than those discussed with reference to the block diagrams, and embodiments discussed with reference to the systems could perform operations different than those discussed with reference to the flow diagram.

System Description

Figure 1:
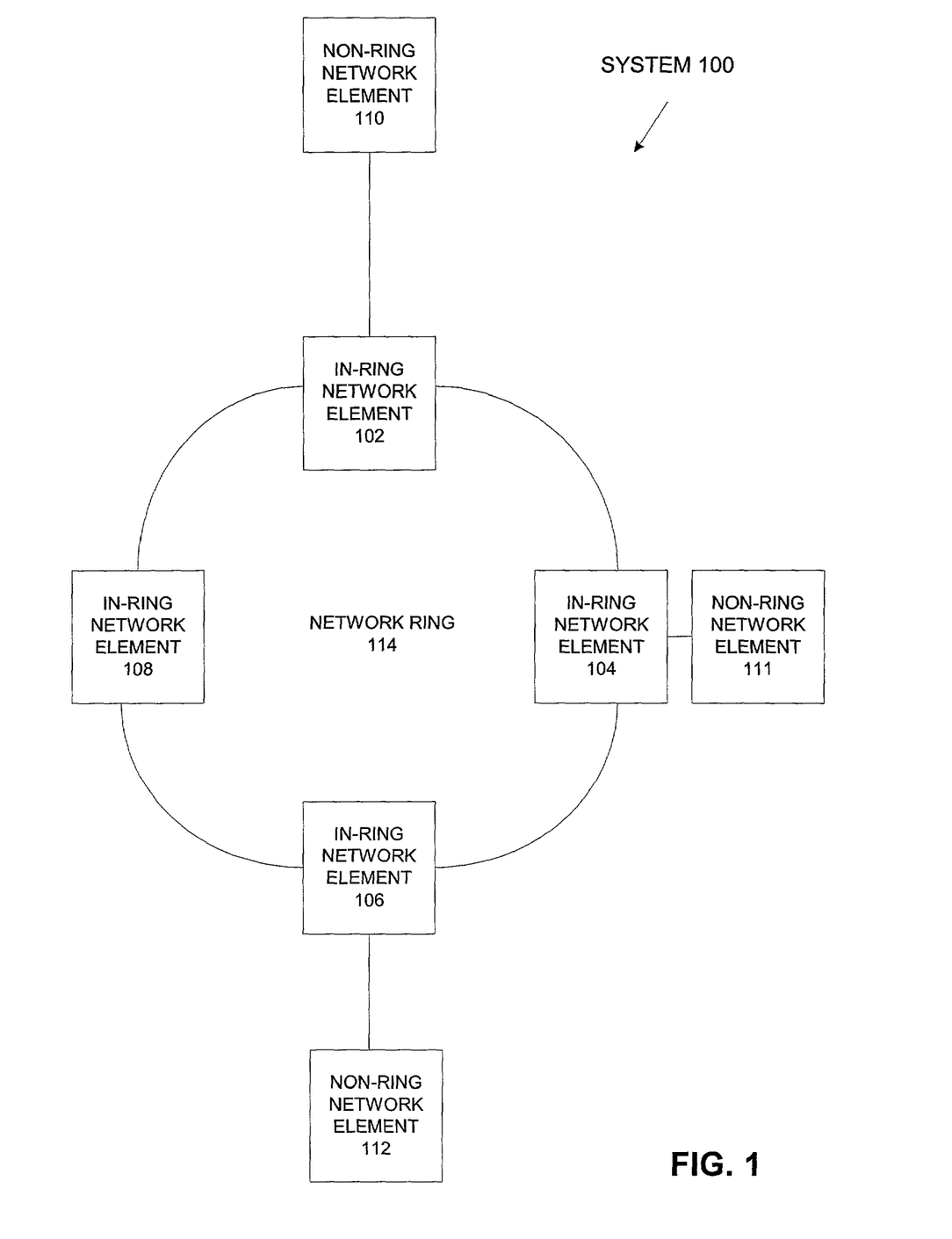
FIG. 1 is a block diagram illustrating a system that incorporates an embodiment of the invention.

FIG. 1 is a block diagram illustrating a system that incorporates an embodiment of the invention. In particular, FIG. 1 illustrates system 100 that includes network ring 114, which is comprised of in-ring network element 102, in-ring network element 104, in-ring network element 106, and in-ring network element 108. System 100 also includes non-ring network element 110, non-ring network element 111, and non-ring network element 112, which are coupled to network ring 114 through in-ring network element 102, in-ring network element 104, and in-ring network element 106, respectively. In an embodiment, non-ring network elements 110–112 can be routers, switches, bridges, or other types of network elements that switch data across a network.

In one embodiment, the connection among in-ring network element 102, in-ring network element 104, in-ring network element 106, and in-ring network element 108 allows for bi-directional traffic. Accordingly, this bi-directional capability allows for redundancy in the communication between the different network elements, such that if a given line of communication is lost, the data traffic to be transmitted thereon can be rerouted in the opposite direction to reach its intended destination within the ring architecture.

In an embodiment, system 100 transmits data traffic among the different network elements, both in-ring and non-ring, employing the Synchronous Optical Network ("SONET") or Synchronous Digital Hierarchy ("SDH") standards. However, embodiments of the system in which the invention is implemented are not so limited, as data traffic among the different network elements can be transferred using other types of transmission standards. Examples of other types of transmission standards can include, but are not limited to, T1, T3, Data Signal ("DS")3, and DS1 signals. In one embodiment, data traffic among in-ring network element 102, in-ring network element 104, in-ring network element 106, and in-ring network element 108 includes Time Division Multiplexing ("TDM") traffic and packet traffic within a same TDM signal.

In this ring network, network elements are used that can transmit and receive TDM ring traffic. In addition, certain of the network elements provide two different switching techniques: TDM and packet. The packet switching provided can support any number of protocols including layer 2 and layer 3 type protocols such as Asynchronous Transfer Mode ("ATM"), Ethernet, Frame Relay, etc. In addition to typical operations of a TDM network element, the network elements are implemented to be able to: (1) programmably select on an Synchronous Transport Signal ("STS") basis certain of the incoming TDM traffic to be extracted and packet switched rather than TDM switched; and/or (2) receive packet traffic in another form and to be packet switched. Regardless of which switching technique is used, the switched traffic going back onto the ring is put in TDM format and transmitted out. However, each time traffic is packet switched, that traffic could be statistically multiplexed (e.g., the packets can be selectively dropped based on various criteria). A further description of the operation of system 100 and the network elements therein is described in more detail below.

The architecture and configuration of system 100 is by way of example and not by way of limitation, as embodiments of the invention can be incorporated in other types of systems. For example, other such systems could incorporate less or more network elements into the network ring and/or network elements attached thereto. Moreover, embodiments of the system in which the invention is implemented are not limited to the network ring architecture as illustrated in FIG. 1. Examples of other types of network architectures that can incorporate embodiments of the system in which the invention is implemented include, but are not limited to, a point-to-point configuration, point-to-multipoint configuration, and a hub configuration. In addition, embodiments of the invention are not limited to TDM networks, but also apply to Wave Division Multiplexing ("WDM") networks.

In-Ring Network Element 102 Description

FIG. 2 is a block diagram illustrating portions of in-ring network elements 102–108 (hereinafter, "in-ring network element 102"), according to an embodiment of the invention. As shown, in-ring network element 102 includes line cards 202a–d and control card(s) 220, such that control card(s) 220 are coupled to each of line cards 202a–d. The number of line cards and control cards illustrated is for the sake of simplicity and not by way of limitation, as a lesser or greater number of line cards and control cards can be included within in-ring network element 102. Additionally, in-ring network element 102 includes a first switch fabric, packet mesh 226, which includes a full mesh such that each of line cards 202a–d are coupled to one another. For example, line card 202a is coupled to line cards 202b–d through packet mesh 226. However, embodiments of the invention are not limited to a full mesh for the transmission of packets among line cards 202a–d, as any type of switching method that switches based on the addressing scheme described herein can be incorporated into embodiments of the invention. For example, in one embodiment, line cards 202a–d could be coupled together using a switch fabric, such that the line cards are coupled to a packet switch card, which provides for the switching therein.

Line cards 202a–d include physical connection circuitry 210a–d, ingress packet processing circuitry 212a–d, and egress packet processing circuitry 214a–d, respectively. Physical connection circuitry 210a–d can be coupled to lines external to in-ring network element 102, as shown, which can carry optical and/or electrical signals. In one embodiment, line cards 202a–d of in-ring network element 102 may be connected to an optical line transmitting SONET Optical Carrier ("OC")-N signals. Moreover, in an embodiment, line cards 202a–d of in-ring network element 102 may be connected to an electrical line such as a T1, T3, E1, E3, Ethernet, Gigabit Ethernet, etc. However, embodiments of the invention are not limited to the above-described examples, as any other type of optical or electrical data transmission can be incorporated into embodiments of the invention. Additionally, control cards(s) 220 include TDM switching circuitry 216. This is by way of example and not by way of limitation, as TDM switching circuitry 216 can be placed in other locations. For example, in an embodiment, TDM switching circuitry 216 is located on a separate card, apart from control card(s) 220.

In an embodiment, each line card 202a–d can be coupled to four optical and/or electrical lines. In another embodiment, each line card 202a–d can be coupled to eight optical and/or electrical lines. However, embodiments of the invention are not so limited, as a lesser or greater number of optical and/or electrical lines can be coupled to in-ring network element 102 through line cards 202a–d. Additionally, physical connection circuitry 210a–d are coupled to ingress packet processing circuitry 212a–d, respectively, such that packet data being received from the optical and/or electrical lines is passed from physical connection circuitry 210a–d to ingress packet processing circuitry 212a–d, respectively. In one embodiment, the packet data is extracted from a TDM signal, which is described in more detail below.

Ingress packet processing circuitry 212a–d is coupled to packet mesh 226. Accordingly, each ingress packet processing circuitry 212a–d is coupled to each egress packet processing circuitry 214a–d, respectively, on line cards 202a–d through packet mesh 226. Moreover, egress packet processing circuitry 214a–d is respectively coupled to physical connection circuitry 210a–d, such that packet data traffic coming in from packet mesh 226 from ingress packet processing circuitry 212a–d is transmitted from egress packet processing circuitry 214a–d to physical connection circuitry 210a–d, respectively.

Line cards incorporated into embodiments of the invention are not limited to those illustrated by line cards 202a–d. Moreover, the in-ring network elements can have different line card configurations from that shown by line cards 202a–d. For example, a given in-ring network element could be limited to a single line card that can receive and transmit TDM traffic (which may include packet traffic) within network ring 114, employing multiple interfaces for the receipt and transmittal of TDM traffic. In another embodiment, a given in-ring network element can include a first line card to receive TDM traffic (which may include packet traffic) from another in-ring network element, while a second line card can transmit TDM traffic to another or same in-ring network element. In one such embodiment, a third line card can be incorporated into this given in-ring network element to add, drop and transmit different types of traffic including different types of packet traffic, such as ATM, Frame Relay, Internet Protocol ("IP"), etc., received and transmitted to a non-ring network element. In another embodiment, a given network element may include a single line card with multiple interfaces such that a first interface receives TDM traffic from another in-ring network element, a second interface transmits TDM traffic to another in-ring network element and a third interface adds, drops, and transmits traffic, such as packet traffic to a non-ring network element. A network element may be connected to multiple rings, either using multiple sets of line cards or multiple interfaces on one set of line cards.

Accordingly, a line card is used either to connect to an in-ring network element to form part of the ring, or to provide communication with out-of ring network elements. To provide some examples with regard to a line card connected with an out-of-ring network element: 1) layer 2/3 traffic from out-of-ring network element can come in, go through the packet mesh to a line card connected to an in-ring network element, and then out onto the ring being carried by a SONET frame; 2) layer 2/3 traffic coming from an out-of-ring network element can be de-mapped into SONET, go through the TDM switch fabric to a line card connected to an in-ring network element, and then out onto the ring being carried by a SONET frame; 3) TDM traffic coming from an out-of-ring network element can come in, go through the TDM switch fabric to a line card connected to an in-ring network element, and then out onto the ring being carried by a SONET frame; 4) TDM traffic coming from an out-of-ring network element carrying layer 2/3 traffic can be processed to extract the layer 2/3 traffic, with the layer 2/3 traffic going through the packet mesh to a line card connected to an in-ring network element, and then out onto the ring carried by a SONET frame; 5) layer 2/3 traffic coming from an out-of-ring network element can go through the packet mesh to a line card connected to an out-of-ring network element, and then go out of the ring being carried by the protocol of the interface of that egress line card; etc. Traffic flows can be full duplex. Accordingly, for each example, there is a corresponding in-ring to out-of-ring capability.

With regard to the TDM traffic, a second switch fabric (in addition to packet mesh 226) is formed among line cards 202a–d and TDM switching circuitry 216 of control cards 220, as illustrated by the dashed lines in FIG. 2. In particular, physical connection circuitry 210a–d is coupled to TDM switching circuitry 216 for the receiving and transmitting of TDM traffic into and out of in-ring network element 102. Accordingly, TDM switching circuitry 216 receive TDM traffic from physical connection circuitry 210a–d and switches this traffic to any of physical connection circuitry 210a–d, based on configuration data for the timeslots of the TDM traffic. For example, TDM switching circuitry 216 could be configured such that data within the first ten timeslots of a TDM signal, such as a SONET/SDH signal, received on a first interface of physical connection circuitry 210a are forwarded out the first ten timeslots of a TDM signal being transmitted out from a first interface of physical connection circuitry 210d.

Description of Line Cards 302a–d

FIG. 3 is a block diagram illustrating portions of physical connection circuitry 210a–d of line cards 202a–d, according to an embodiment of the invention. Returning to FIG. 2 to help illustrate, in one embodiment, the components and circuitry shown within FIG. 3 illustrate the processing of DS signals, which are to be transmitted out from in-ring network elements 102–108 through physical connection circuitry 210a–d, wherein the DS signals are located within SONET frames being received from TDM switching circuitry 216 of control card(s) 220.

For example, returning to FIG. 2, a DS3 signal could be transmitted from non-ring network element 111 to non-ring network element 110 through in-ring network elements 104 and 102. For transmission from non-ring network element 111 to in-ring network element 104, the DS3 signal would travel on a T3 transmission line.

However, for transmission between in-ring network element 104 and in-ring network element 102, the type of transmission line and protocol include an optical line and SONET protocol, respectively. Accordingly, for transmission within network ring 114, the DS3 signal is placed within the payload of SONET frames of the SONET signal being transmitted between in-ring network element 104 and in-ring network element 102. Moreover, for transmission from in-ring network element 102 to non-ring network element 110, another T3 transmission line is employed for the transmission of the DS3 signal. Accordingly, within in-ring network element 102, the DS3 signal is extracted from the SONET frames and transmitted to non-ring network element 110 as a T3 signal. For this illustration, the extraction of the DS3 signal from the SONET clock domain to the DS3 clock domain are performed by the components and circuitry shown in FIG. 3.

Returning to FIG. 3, line card 202a–d includes channel output circuitry 370, line interface unit 356, low-pass filter unit 310 and voltage-controlled crystal oscillator unit 312. In an embodiment, channel output circuitry 370 and line interface unit 356 can be included within physical connection circuitry 210 (illustrated in FIG. 2). Additionally, the location of low-pass filter unit 310 and voltage controlled crystal oscillator unit 312 in reference to channel output circuitry 370 (shown in FIG. 3) is by way of example and not by way of limitation. For example, in another embodiment, low-pass filter unit 310 and/or voltage controlled crystal oscillator unit 312 can be included within channel output circuitry 370.

Channel output circuitry 370 includes FIFO unit 302, frequency phase detector unit 322, demapper unit 336, and deframer unit 338. In an embodiment, demapper unit 336 comprises a SONET demapper. In one embodiment, deframer unit 338 comprises a SONET deframer. In an embodiment, control circuitry 334 includes a number of configuration registers. These configuration registers can include configuration data that can allow for the adjustment of how fast sudden changes in the depth of FIFO unit 302, due to pointer adjustments in the incoming SONET signal, are "leaked" from frequency phase detector unit 322 to low-pass filter unit 310. In one embodiment, this configuration data can allow for the disablement of this adjustment in the depth of FIFO unit 302. This configuration data can allow for other modifications in the operation of embodiments of the invention. For example, in an embodiment, this configuration data can allow for the resetting of FIFO unit 302.

Deframer unit 338 is coupled to receive input signal 340. Deframer unit 338 is also coupled to demapper unit 336, such that deframer unit 338 transmits mapped input data 306 to demapper unit 336. Demapper unit 336 includes control circuitry 334. Control circuitry 334 is coupled to FIFO unit 302 and frequency phase detector unit 322. As will be described in more detail below, control circuitry 334 extracts the data from mapped input data 306 and forwards this extracted data (as input data 360) into FIFO unit 302. FIFO unit 302 is coupled to frequency phase detector unit 322, wherein the depth of FIFO unit 302 is transmitted to frequency phase detector unit 322. Frequency phase detector unit 322 is coupled to low-pass filter unit 310. Low-pass filter unit 310 is coupled to voltage-controlled crystal oscillator unit 312. Voltage-controlled crystal oscillator unit 312 is coupled to FIFO unit 302, line interface unit 356 and DS3 deframer unit 350, wherein voltage-controlled crystal oscillator unit 312 transmits clock signal 320 to FIFO unit 302, line interface unit 356 and DS3 deframer unit 350.

Voltage-controlled crystal oscillator unit 312, frequency phase detector unit 322, and low-pass filter unit 310 comprise a phase-locked loop. The phase-locked loop is used to generate clock signal 320 by which FIFO unit 302 is unloaded. Specifically, a signal from FIFO unit 302 regarding its depth is transmitted to the phase-locked loop. The phase-locked loop generates clock signal 320, which can then be transmitted back to FIFO unit 302 for unloading output data 352. For embodiments of other types of temporary storage units, any reference to 'depth' is interpreted as being to the amount of data currently in the temporary storage unit. FIFO unit 302 is also coupled to line interface unit 356 and DS3 deframer unit 350, such that FIFO unit 302 can transmit output data 352 to line interface unit 356 and DS3 deframer unit 350. Line interface unit 356 transmits output signal 314 out from line card 202.

Deframer unit 338 is coupled to receive input signal 340 and can locate and extract the SONET frames from within input signal 340 and forward the SONET frames to demapper unit 336. In one embodiment, mapped input data 306 is a stream of SONET frames from input signal 340. Although input signal 340 is described in terms of including SONET frames, embodiments of the invention are not so limited. For example, in an embodiment, input signal 340 could include synchronous digital hierarchy (SDH) frames. Demapper unit 336 can receive a first signal, comprising data bits, overhead bits, fixed stuffing bits, and a pattern of variable stuffing bits (in one embodiment, the SONET frames in mapped input data 306), and separate the data bits in the first signal from the stuffing and overhead bits in the first signal. Demapper unit 336 forwards the data bits from the first signal to FIFO unit 302 for storage of such data (i.e., input data 360).

Control circuitry 334 can receive error signals regarding mapped input data 306. In an embodiment, an error signal is generated by deframer unit 338 and transmitted along with the data from mapped input data 306, however embodiments of the invention are not so limited, as control circuitry 334 can receive an error signal from any component upstream. For example, a different network element coupled to the network element that includes line card 202a–d as shown in FIG. 3 can transmit an error signal. In another embodiment, control circuitry 334 can detect errors in mapped input data 306 that were not detected previously and generate an error signal accordingly. Typically if, upon the presence of an error, no data were transmitted to FIFO unit 302, FIFO unit 302 would empty, and upon restart, could possibly overflow. Moreover, in the absence of an indication that the incoming data is defective due to a problem upstream, demapper unit 336 might interpret the incoming defective data as if it were a signal with stuffing control information and therefore due to such defective stuffing control information, demapper unit 336 might put too much or too little data into FIFO unit 302. Accordingly, FIFO unit 302 might empty or fill to capacity, leading to overflow or underflow, respectively, once a valid signal has been restored.

In an embodiment, upon detection of an error in mapped input data 306 (and continuing during the presence of the error), control circuitry 334 treats mapped input data 306 as a signal that is operating at the nominal rate for such a signal and independent of errors therein. For example, if mapped input data 306 were replaced by random noise, it would appear to be stuffed at a 50% ratio, rather than the approximately 67% ratio of a nominal-rate mapped DS3 signal. Accordingly, an additional 12,000 bits of data per second would be loaded into FIFO unit 302. Therefore, control circuitry 334 assumes the nominal rate stuffing for such a signal, which includes a predetermined pattern of data and stuffing (both variable and fixed) bits, (which is described in more detail below).

Stuffing is data included within a signal to allow for synchronization between network elements. In particular, fixed stuffing typically is one or more dummy bits that do not include information-carrying data, are discarded at the receiving end, and therefore, are not placed in FIFOs at the receiving end. Variable stuffing can be either fixed stuffing or additional data. Overhead is fixed stuffing or provisional data regarding the particular frame and/or signal containing the frames. This predetermined combination of bits that allows the signal to include the nominal rate stuffing is such that the depth of FIFO unit 302 is read and outputted to the phase-locked loop such that voltage-controlled crystal oscillator unit 312 can operate at a nominal rate that is approximately a rate at which it would operate if the data bits from the first signal were being transmitted to FIFO unit 302, i.e. if no error was detected (and the depth of FIFO unit 302 was changing accordingly). In other words, the phase-locked loop is remaining in lock, with control circuitry 334 inserting bits into FIFO unit 302 at a nominal rate and the phase-locked loop striving to keep FIFO unit 302 centered, such that the phase-locked loop unloads the data at the same average rate.

Voltage-controlled crystal oscillator unit 312 can then generate clock signal 320 and transmit it to FIFO unit 302. In one embodiment, the predetermined pattern is two bits of stuffing, followed by one bit of data, followed by two bits of stuffing, followed by one bit of data, etc., the predetermined pattern repeating itself. However, embodiments of the invention are not so limited, as different predetermined pattern may be chosen. Therefore with the signal containing errors being treated as a valid signal with nominal rate stuffing, the amount of data being inputted into FIFO unit 302 will be that amount of data associated with a nominal rate signal (instead of not inputting data into FIFO unit 302 due to the lack of valid data within the signal containing errors).

In another embodiment, upon detection of an error in mapped input data 306 (and continuing during the presence of the error), control circuitry 334 generates a second signal comprising a plurality of arbitrary bits, a plurality of fixed stuffing bits, and a predetermined pattern of variable stuffing bits, wherein each of the variable stuffing bits includes either a data bit or a fixed stuffing bit. Control circuitry 334 can then cause the transmission of the second signal to FIFO unit 302, independent of any fixed stuffing bits. In another embodiment, control circuitry 334 causes the generation of the data bits that would equal the amount of data if there was a given pattern of stuffing (there being no need to generate stuffing). In one embodiment, control circuitry 334 causes the transmission of a standard alarm-indication signal bit stream to FIFO unit 302 at a nominal rate for such a bit stream.

Upon receipt of clock signal 320 during a time when an error is detected, the depth of FIFO unit 302 will approximate the depth that it would have if the first signal were error-free and transmitted thereto, independent of any fixed stuffing or overhead bits. Upon detection that the first signal is error-free, control circuitry 334 can transmit the data bits, of the first signal independent of any fixed stuffing bits or overhead bits, to FIFO unit 302 (control circuitry 334 would no longer transmit the second signal). Accordingly, voltage-controlled crystal oscillator unit 312 will already be operating at the nominal rate for this input data signal and can transmit an appropriate clock signal 320 for unloading FIFO unit 302.

Description of Mapped Input Data 306

Figure 4:
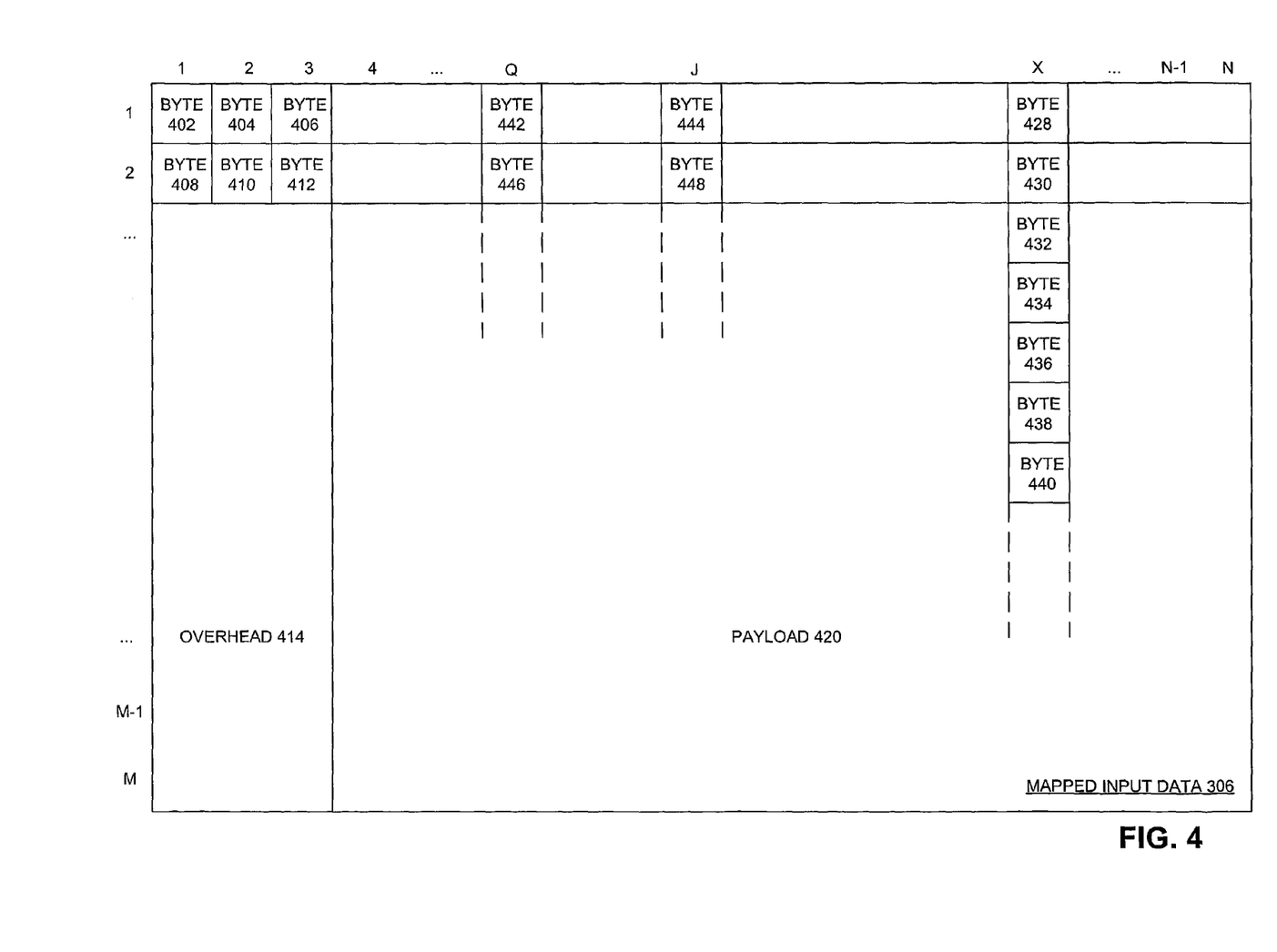
FIG. 4 is a diagram illustrating one frame of mapped input data 306, according to an embodiment of the invention.

FIG. 4 is a diagram illustrating one frame of mapped input data 306, according to an embodiment of the invention. As shown, FIG. 4 illustrates an individual frame of mapped input data 306, which is based on the SONET standard. In other embodiments, mapped input data 306 could include inputted bits based on the SDH standard. In particular, FIG. 4 depicts several rows of inputted bits numbered 1 through M and several columns of inputted bits numbered 1 through N, such that the upper left corner of mapped input data 306 is column 1, row 1, and the lower right corner of mapped input data 306 is column N, row M. For purposes of discussion, the inputted bits are referred to in the form of bytes (8 bits). As will be described in more detail below, the bits shown in mapped input data 306 can include a combination of data and stuffing bits. Moreover, embodiments of the invention are described with reference to the SONET and SDH standards. This is by way of example and not by way of limitation, as other standards (such as DS1s in DS2s, E1s in E3s, etc) that includes data, overhead and stuffing (both fixed and variable) can be incorporated into embodiments of the invention.

Mapped input data 306 is divided into two sections: overhead 414 consists of columns 1 through 3, and payload 420 consists of columns 4 through N. Each block of mapped input data 306 (consisting of one row coordinate and one column coordinate) contains one byte of inputted bits. However, embodiments of the invention are not so limited. For example, a block of mapped input data 306 may consist of one or more bits, one or more words, etc. In order to allow for alignment of the different frames in mapped input data 306, the starting location of payload 420 in a given SONET frame is dynamic.

Row 1 of mapped input data 306 includes byte 402, byte 404, and byte 406, which are located at columns 1 through 3 in row 1, respectively, and byte 442 (column Q), byte 444 (column J), and bite 428 (column X). Row 2 of mapped input data 306 includes byte 408, byte 410, and byte 412, which are located at columns 1 through 3 in row 2, respectively, and byte 446 (column Q), byte 448 (column J), and byte 430 (column X). In an embodiment, rows 3 through M have similar bytes. Column X also comprises byte 432, byte 434, byte 436, byte 438, and byte 440, in sequential rows above row 2, respectively. Bytes 428, 430, 432, 434, 436, 438, and 440 each comprise one bit of variable stuffing. Returning to FIG. 3 for purposes of discussion, control circuitry 334 can generate the second signal to have the format of mapped input data 306, wherein the predetermined pattern of variable stuffing bits is located in column X. In one embodiment, the predetermined pattern is two bits of stuffing, followed by one bit of data, followed by two bits of stuffing, followed by one bit of data, etc., the predetermined pattern repeating itself indefinitely. However, embodiments of the invention are not so limited, as a different predetermined pattern may be chosen. The first signal, mapped input data 306, has a pattern of variable stuffing bits in column X that is approximately the same as the predetermined pattern. Columns Q and J comprise fixed stuffing bits. Returning to FIG. 3, the plurality of fixed stuffing bits are located in columns Q and J, in one embodiment.

The contents of mapped input data 306, as indicated in FIG. 4, are for the purpose of simplicity and not by way of limitation, as a greater or lesser amount of inputted bits and stuffing or a different configuration thereof is possible.

Operation of Control Circuitry 334

Certain operations of control circuitry 334 and other components illustrated in FIG. 3 will now be described in conjunction with the flow diagram of FIG. 5. FIG. 5 illustrates a flow diagram for maintaining operations of a FIFO unit at a nominal rate, independent of whether the incoming data signal, whose data is to be stored in the FIFO unit, includes errors, according to an embodiment of the invention.

Method 500 of FIG. 5 commences with demapper unit 336 receiving mapped input data 306 of input data signal 340, at process block 502. In an embodiment, mapped input data 306 includes a number of SONET frames from deframer unit 338. Control circuitry 334 determines whether mapped input data 306 includes errors (i.e., whether mapped input data 306 is invalid), at process decision block 504. In one embodiment, control circuitry 334 detects errors within mapped input data 306. In another embodiment, deframer unit 338 detects errors in input data signal 340 and transmits an indication to control circuitry 334 that mapped input data 306 is not valid. In an embodiment, errors are detected upstream from a source external to the receiving network element. Accordingly, this source can transmits an indication that the data within input data signal 340 includes errors. This indication can be received by deframer unit 338 and forwarded to control circuitry 334.

Control circuitry 334 processes mapped input data 306, which is described in more detail below in conjunction with process blocks 506 and 508. In particular, upon determining that mapped input data 306 includes errors (either from within or from a different source), control circuitry 334 substitutes, within mapped input data 306, the current stuffing information (data) with stuffing information (data) associated with a data signal that is operating at a nominal rate for such a signal, at process block 506. Such stuffing information (data) includes the predetermined pattern of stuffing (both fixed and variable), as described above. This predetermined pattern (as described in FIG. 3) of a signal operating at a nominal rate is such that the depth of FIFO unit 302 is read and outputted to the phase-locked loop such that voltage-controlled crystal oscillator unit 312 can operate at a rate that is approximately a rate at which it would operate if the first signal were being transmitted to FIFO unit 302, independent of any overhead or fixed stuffing bits i.e., no errors present (and FIFO unit 302's depth were changing accordingly). However, embodiments of the invention are not so limited. As described above, in other embodiments, control circuitry 334 generates a different data signal (having data arriving at a nominal rate) with stuffing information at the nominal rate.

Upon determining that mapped input data 306 does not include errors, control circuitry 334 continues processing at process block 508 (which is described in more detail below). In particular, control circuitry 334 causing the transmission and storage of the data within the modified or unmodified signals (depending on whether the signal includes errors), independent of any stuffing bits, into FIFO unit 302, at process block 508.

As described, embodiments of the invention enable the depth of a FIFO or other storage unit to remain at a depth associated with storing data from a signal operating at the nominal rate for such a signal, independent of whether the signal includes errors. Accordingly, embodiments of the invention reduce potentially wide fluctuations in the depth of a FIFO. In particular, these potentially wide fluctuations in the depth of a FIFO can be caused when there are sudden changes in the amount of data being inputted into the FIFO due, for example, to periods of inputting data from a signal followed by periods of not inputting data from the signal when the signal contains errors. Further, embodiments of the invention enable a phase-locked loop to remain in lock, with a FIFO (that the loop is controlling) remaining approximately half-full, thereby precluding FIFO and clocking-rate excursions upon signal restoration due to an incorrect clocking rate from the VCXO of the phase-locked loop.

The line cards and control cards included in the different network elements include memories, processors, and/or Application Specific Integrated Circuits ("ASICs"). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM), random access memory (RAM), magnetic disk storage media; optical storage media, flash memory devices, electrical, optical, acoustical, or other form of propagated signals (e.g., carrier waves, infrared signals, digital signals, etc.), etc.

Thus, a method and apparatus for the operations of a storage unit in a network element have been described. Although the invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
    receiving a data signal;
    determining the data signal includes a number of errors; and
    processing the data signal as if the data signal is independent of the number of errors and is operating at a nominal rate for the data signal, wherein the processing is to include transmitting the data within the data signal into a first-in-first-out (FIFO) memory unit.

2. The method of claim 1, wherein the processing is to include substituting current stuffing data of the data signal with stuffing data for a data signal operating at the nominal rate.

3. The method of claim 2, wherein the stuffing data for the data signal operating at the nominal rate includes a predetermined pattern of variable stuffing bits.

4. The method of claim 1, wherein the FIFO memory unit is within a network element and wherein determining the data signal includes the number of errors comprises receiving an indication from a different network element that the data signal includes the number of errors, wherein the different network element is coupled to the network element and is transmitting the data signal to the network element.

5. The method of claim 1, wherein the nominal rate for the data signal comprises a nominal rate for a Synchronous Optical Network signal.

6. A method comprising:
    receiving a data signal;
    determining the data signal includes a number of errors; and
    generating a different data signal, the different data signal operating at a nominal rate for the data signal; and
    transmitting data within the different data signal into a first-in-first-out (FIFO) memory unit.

7. The method of claim 6, wherein the different data signal comprises stuffing data.

8. The method of claim 7, wherein the stuffing data for the different data signal operating at the nominal rate includes a predetermined pattern of variable stuffing bits.

9. The method of claim 6, wherein the FIFO memory unit is within a network element and wherein determining the data signal includes the number of errors comprises receiving an indication from a different network element that the data signal includes the number of errors, wherein the different network element is coupled to the network element and is transmitting the data signal to the network element.

10. The method of claim 6, wherein the nominal rate for the data signal comprises a nominal rate for a Synchronous Optical Network signal.

11. An apparatus comprising:
    a storage unit to store data from a data signal; and
    control circuitry coupled to the storage unit, the control circuitry to cause the storage of the data from the data signal into the storage unit at a nominal rate upon determining that the data signal includes a number of errors.

12. The apparatus of claim 11, wherein causing, by the control circuitry, the inputting of the data from the data signal into the storage unit at the nominal rate upon determining that the data signal includes a number of errors comprises substituting current stuffing data of the data signal with stuffing data for a data signal operating at the nominal rate.

13. The apparatus of claim 11, comprising a frequency phase detector unit coupled to the storage unit and the control circuitry, the frequency phase detector unit to receive a depth value of the storage unit from the storage unit, wherein the frequency phase detector unit is to generate a signal corresponding to the depth value.

14. The apparatus of claim 13, comprising a low-pass filter unit coupled to the frequency phase detector unit, the low-pass filter unit to receive the signal corresponding to the depth value and wherein the low-pass filter unit is to generate a filtered signal based on the signal corresponding to the depth value.

15. The apparatus of claim 14, comprising a voltage-controlled crystal oscillator unit coupled to the low-pass filter unit and the storage unit, the voltage-controlled crystal oscillator unit to receive the filtered signal and to generate a clock signal, wherein the voltage-controlled crystal oscillator unit is to transmit the clock signal to the storage unit, the clock signal to control an output rate of the storage unit.

16. The apparatus of claim 11, wherein the storage unit comprises a first-in-first-out unit.

17. The apparatus of claim 11, wherein the nominal rate for the data signal comprises a nominal rate for a Synchronous Optical Network signal.

18. A line card in a network element comprising:
    a first-in-first-out (FIFO) unit to store Data Signal (DS) data from a Synchronous Optical Network (SONET) signal; and
    control circuitry coupled to the FIFO unit, the control circuitry to cause inputting of data into the FIFO unit at a rate for the SONET signal upon determining that the SONET signal is invalid.

19. The line card of claim 18, comprising a frequency phase detector unit coupled to the FIFO unit and the control circuitry, the frequency phase detector unit to receive a depth value of the FIFO unit from the FIFO unit, wherein the frequency phase detector unit is to generate a signal corresponding to the depth value.

20. The line card of claim 19, comprising a low-pass filter unit coupled to the frequency phase detector unit, the low-pass filter unit to receive the signal corresponding to the depth value and wherein the low-pass filter unit is to generate a filtered signal based on the signal corresponding to the depth value.

21. The line card of claim 20, comprising a voltage-controlled crystal oscillator unit coupled to the low-pass filter unit and the FIFO unit, the voltage-controlled crystal oscillator unit to receive the filtered signal and to generate a clock signal, wherein the voltage-controlled crystal oscillator unit is to transmit the clock signal to the FIFO unit, the clock signal to control an output rate of the FIFO unit.

22. The line card of claim 18, wherein causing, by the control circuitry, the inputting of the data from the data signal into the FIFO unit at the rate for the SONET signal upon determining that the SONET signal is invalid comprises substituting current stuffing data of the SONET signal with stuffing data for a data signal operating at the rate for a SONET signal.

23. A system comprising:
a number of line cards comprising,
a first-in-first-out (FIFO) unit to store data from a data signal; and
control circuitry coupled to the FIFO unit, the control circuitry to cause inputting of data into the FIFO unit at a nominal rate for the data signal upon determining that the data signal is invalid; and
a number of control cards coupled to the number of line cards, the number of control cards to transmit provisioning data associated with the data signal to the number of line cards.

24. The system of claim 23, comprising a frequency phase detector unit coupled to the FIFO unit and the control circuitry, the frequency phase detector unit to receive a depth value of the FIFO unit from the FIFO unit, wherein the frequency phase detector unit is to generate a signal corresponding to the depth value.

25. The system of claim 24, comprising a low-pass filter unit coupled to the frequency phase detector unit, the low-pass filter unit to receive the signal corresponding to the depth value and wherein the low-pass filter unit is to generate a filtered signal based on the signal corresponding to the depth value.

26. The system of claim 25 comprising a voltage-controlled crystal oscillator unit coupled to the low-pass filter unit and the FIFO unit, the voltage-controlled crystal oscillator unit to receive the filtered signal and to generate a clock signal, wherein the voltage-controlled crystal oscillator unit is to transmit the clock signal to the FIFO unit, the clock signal to control an output rate of the FIFO unit.

27. The system of claim 23, wherein causing, by the control circuitry, the inputting of the data from the data signal into the FIFO unit at a nominal rate for the data signal upon determining that the data signal is invalid comprises substituting current stuffing data of the data signal with stuffing data for a data signal operating at the nominal rate for a data signal.

28. A machine-readable medium that provides instructions, which when executed by a machine, causes the machine to perform operations comprising:
receiving a data signal;
determining the data signal includes a number of errors; and
processing the data signal as if the data signal is independent of the number of errors and is operating at a nominal rate for the data signal, wherein the processing is to include transmitting the data within the data signal into a first-in-first-out (FIFO) memory unit.

29. The machine-readable medium of claim 28, wherein the processing is to include substituting current stuffing data of the data signal with stuffing data for a data signal operating at the nominal rate.

30. The machine-readable medium of claim 29, wherein the stuffing data for the data signal operating at the nominal rate includes a predetermined pattern of variable stuffing bits.

31. The machine-readable medium of claim 28, wherein the FIFO memory unit is within a network element and wherein determining the data signal includes the number of errors comprises receiving an indication from a different network element that the data signal includes the number of errors, wherein the different network element is coupled to the network element and is transmitting the data signal to the network element.

32. The machine-readable medium of claim 28, wherein the nominal rate for the data signal comprises a nominal rate for a Synchronous Optical Network signal.

* * * * *